Figure 1:
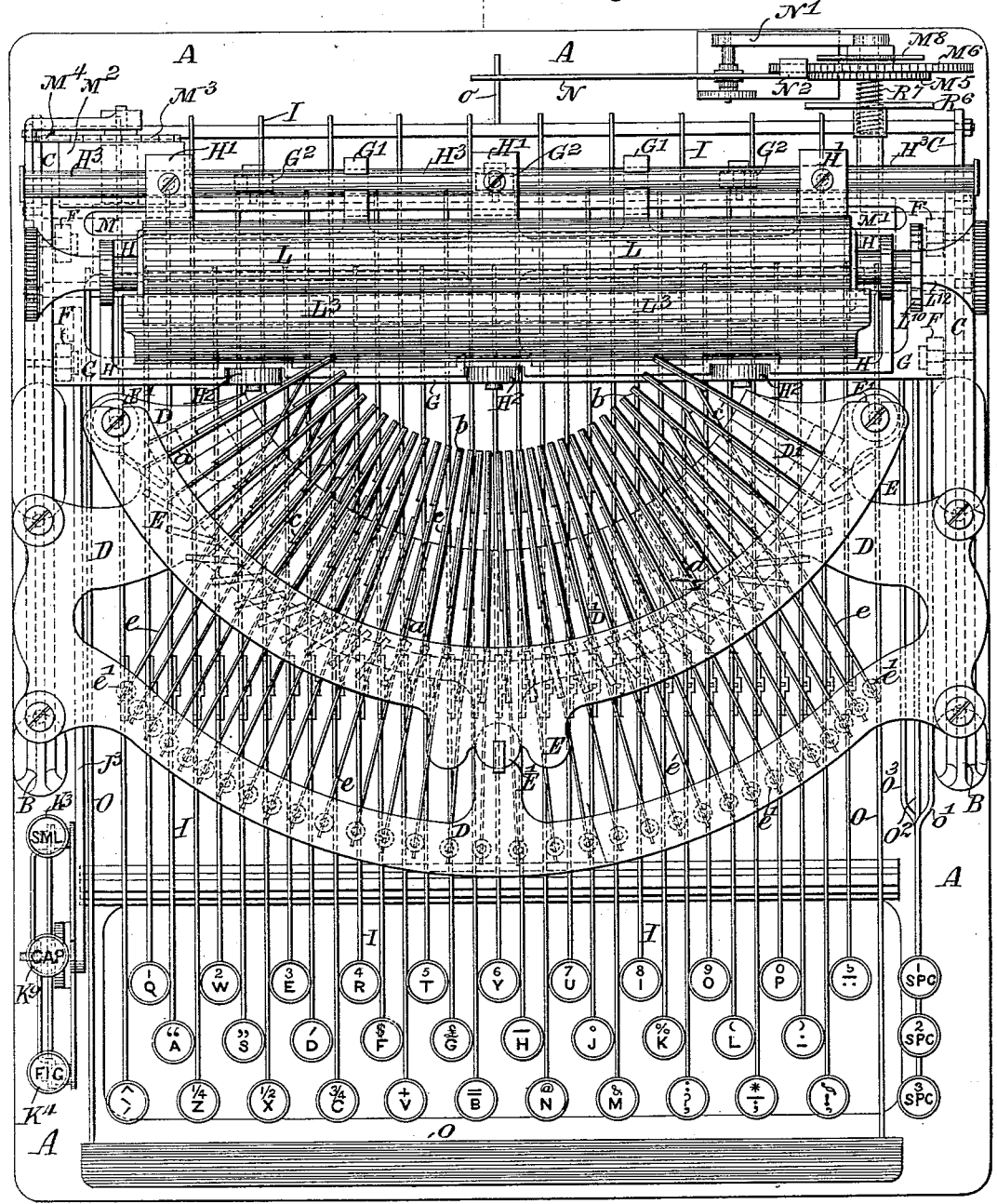

(No Model.) J. N. MASKELYNE, Jr. 7 Sheets—Sheet 3.
TYPE WRITING MACHINE.
No. 560,142. Patented May 12, 1896.

Witnesses:—
George Barry.
C. Lundgren

Inventor:—
John Nevil Maskelyne Junr
by attorneys
Brown & Seward

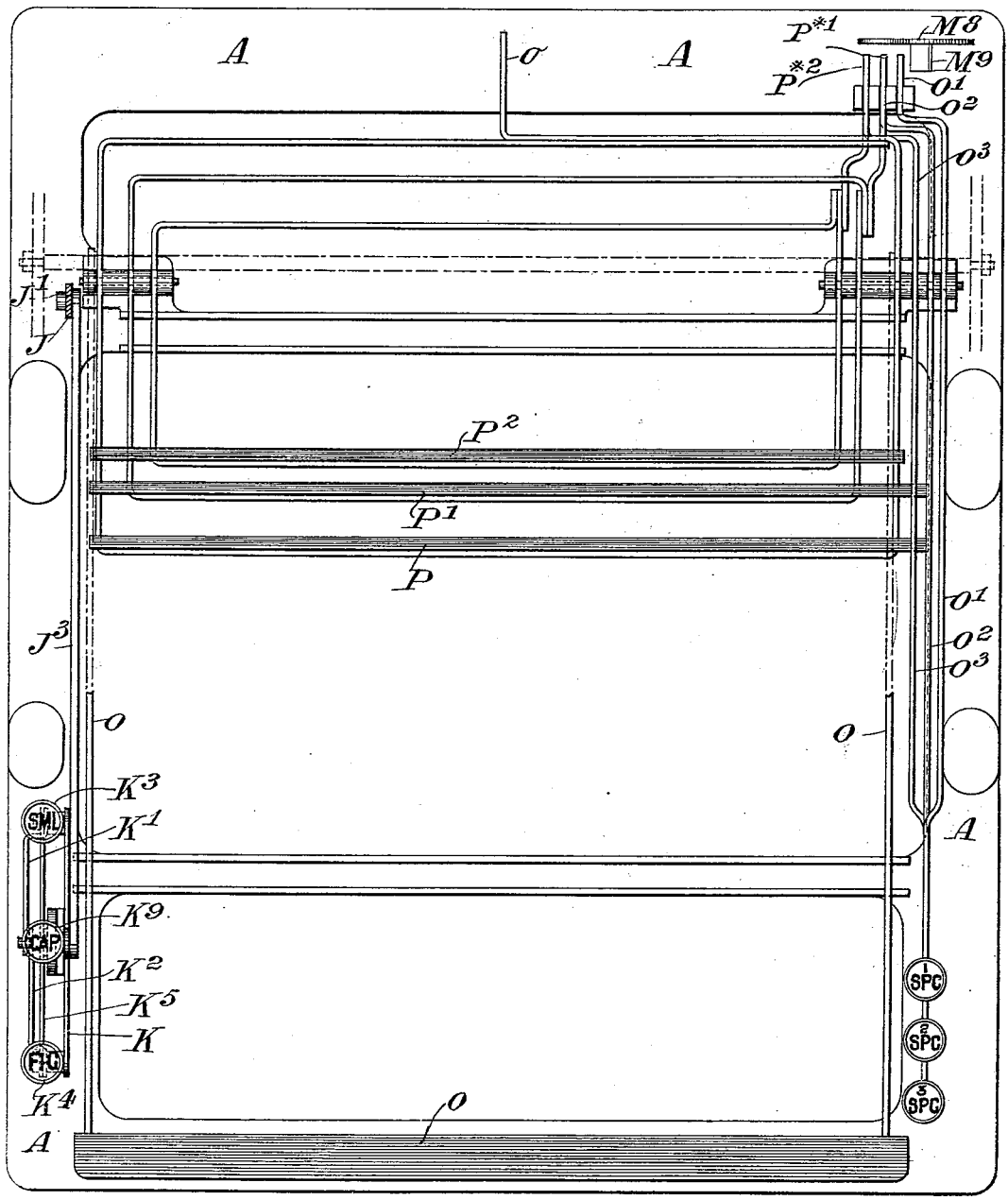

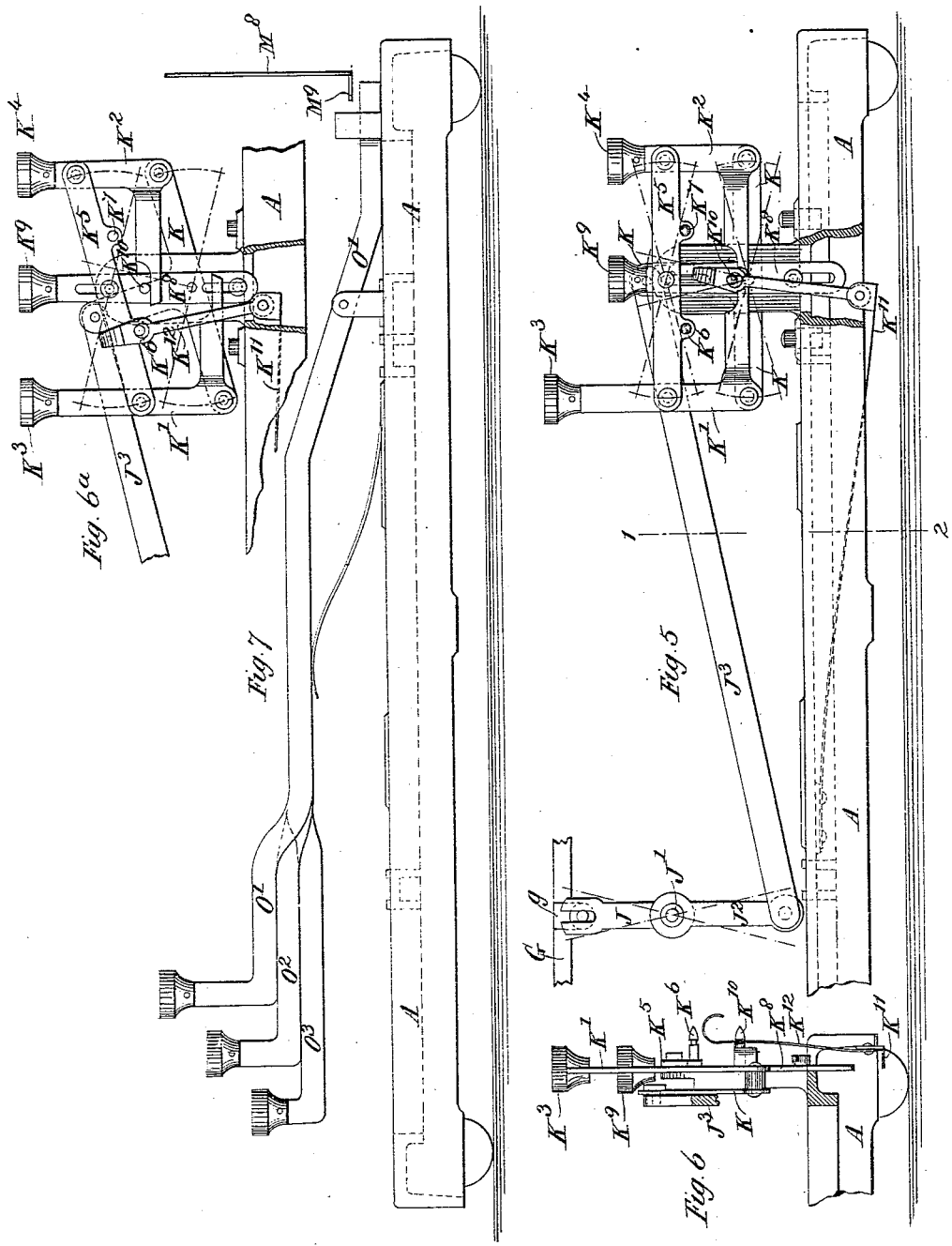

(No Model.) 7 Sheets—Sheet 6.
J. N. MASKELYNE, Jr.
TYPE WRITING MACHINE.
No. 560,142. Patented May 12, 1896.
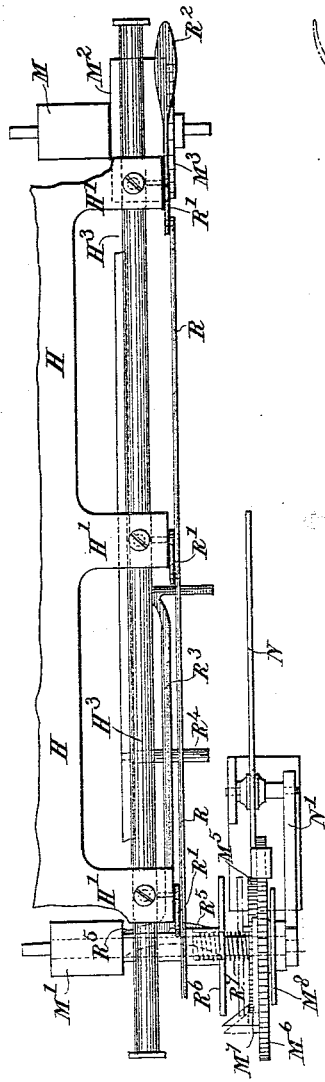
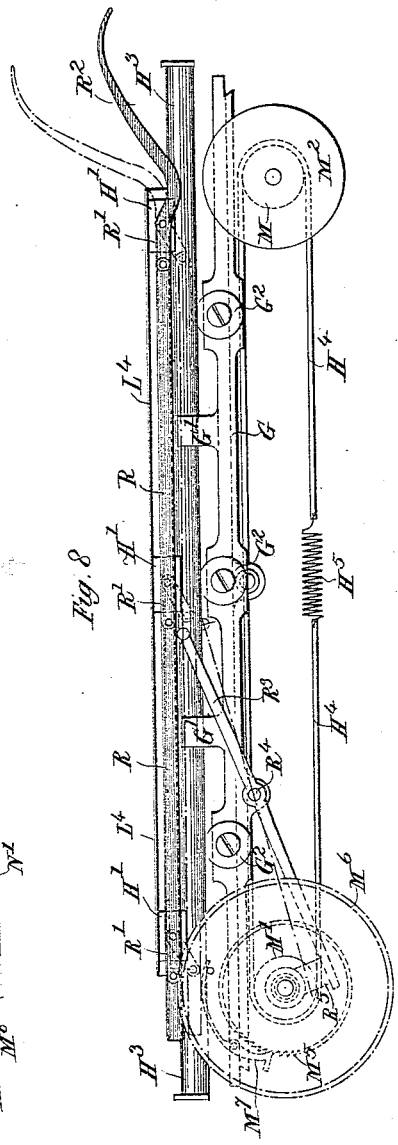
Witnesses:
George Barry,
C. Lundgren
Inventor:-
John Nevil Maskelyne Junr
by attorneys
Brown & Seward (No Model.) 7 Sheets—Sheet 7.
J. N. MASKELYNE, Jr.
TYPE WRITING MACHINE.
No. 560,142. Patented May 12, 1896.
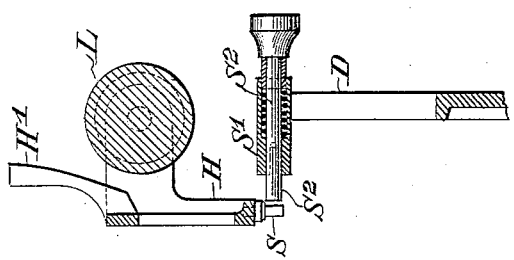
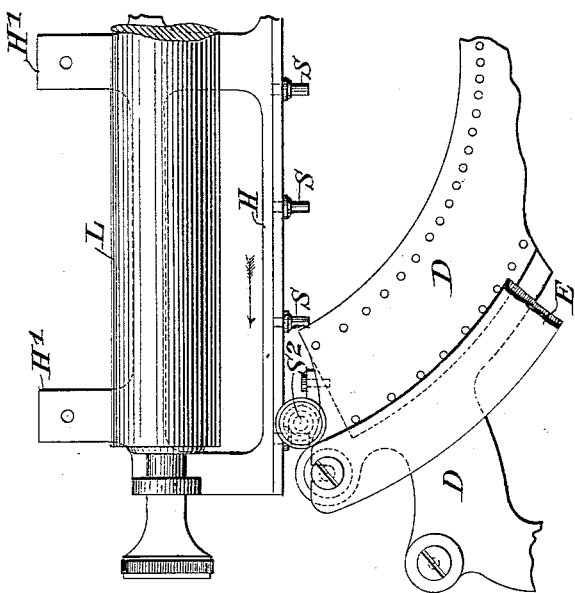

UNITED STATES PATENT OFFICE.

JOHN NEVIL MASKELYNE, JR., OF LONDON, ENGLAND.

TYPE-WRITING MACHINE.

SPECIFICATION forming part of Letters Patent No. 560,142, dated May 12, 1896.

Application filed December 7, 1894. Serial No. 531,080. (No model.) Patented in England June 19, 1894, No. 11,862.

*To all whom it may concern:*

Be it known that I, JOHN NEVIL MASKELYNE, Jr., of the Egyptian Hall, Piccadilly, London, in the county of Middlesex, England, have invented certain new and useful Improvements in Type-Writers, (for which I have obtained Letters Patent of Great Britain, No. 11,862, dated June 19, 1894,) of which the following is a specification.

This invention has reference more especially to improvements on the type-writer for which Letters Patent were obtained in the United States of America, dated August 18, 1891, No. 457,903, the object of the present invention being to simplify and improve the construction of these type-writers; but the invention has also for its object, by the addition of certain appliances which will be hereinafter fully described, to remedy certain defects in and to improve the working generally of these instruments. In the aforesaid patent a free and easy action of the keys which actuate the printing mechanism is obtained, and so much so that the operator can use every finger of both hands, the operation of the keys being effected in a manner similar to and without needing much more effort than is required to manipulate the keyboard of an organ.

In the present invention this freedom of action is retained and is improved upon, a peculiar arrangement of type-lever mechanism being employed which will have this result. The types also strike the paper in sight of the operator, and the types are provided with ink from a pad, as before, instead of using the inking-ribbon or carbon. Three characters or type are still placed upon each type-bar, the paper-carriage being moved longitudinally of the machine, as before, to bring the paper into position to receive the impress of the particular type or character of the three required.

In the present invention provision is made for obtaining a variety of spacing; also for moving the paper-carriage without operating the levers; also for stopping the paper-carriage at any given position, when it is desired to produce columns of figures, and, finally, for underlining in a more convenient manner than heretofore.

Having thus stated, broadly, the special features of the present invention I will now proceed to fully described the apparatus.

Figure 2:
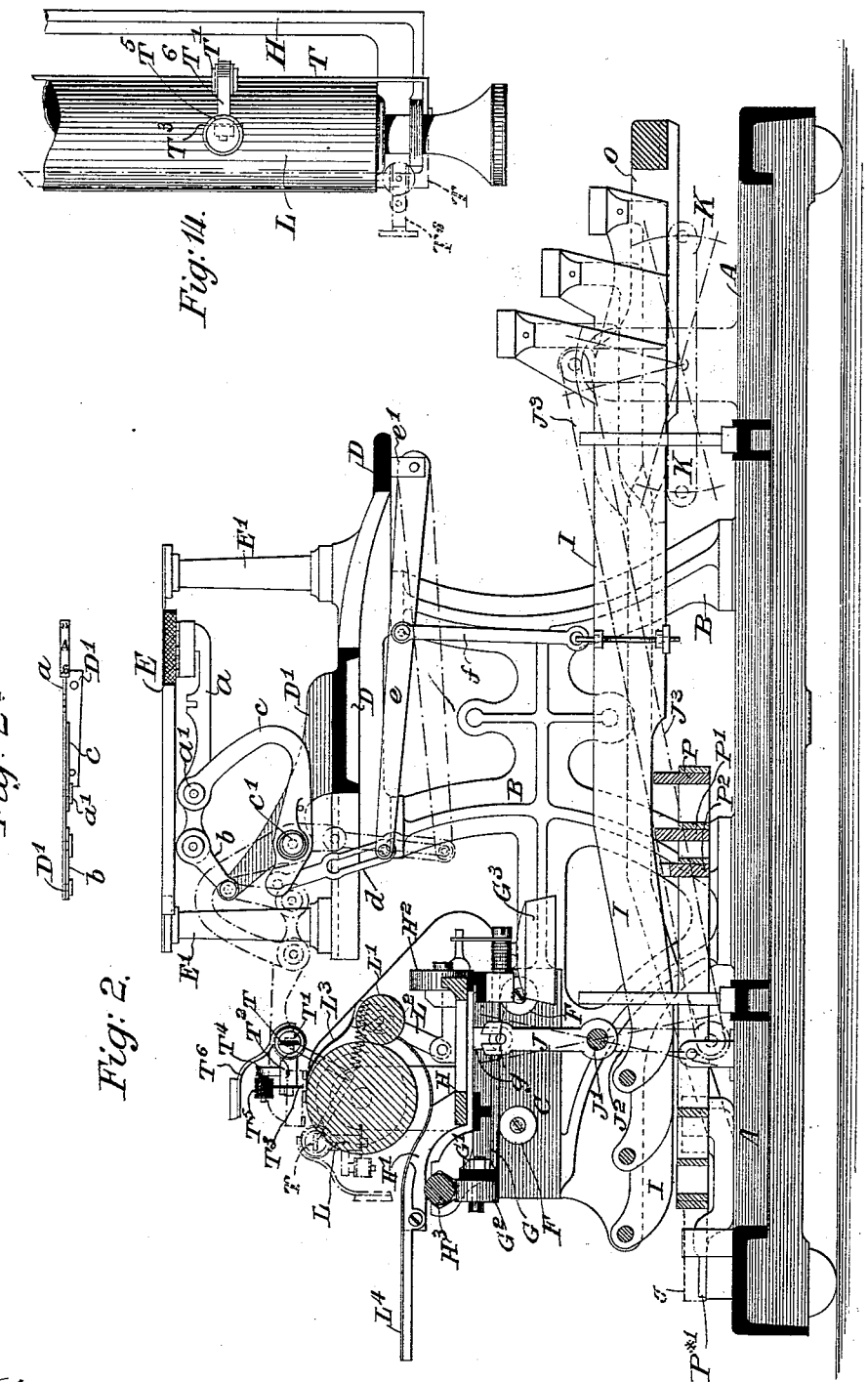
Figure 3:
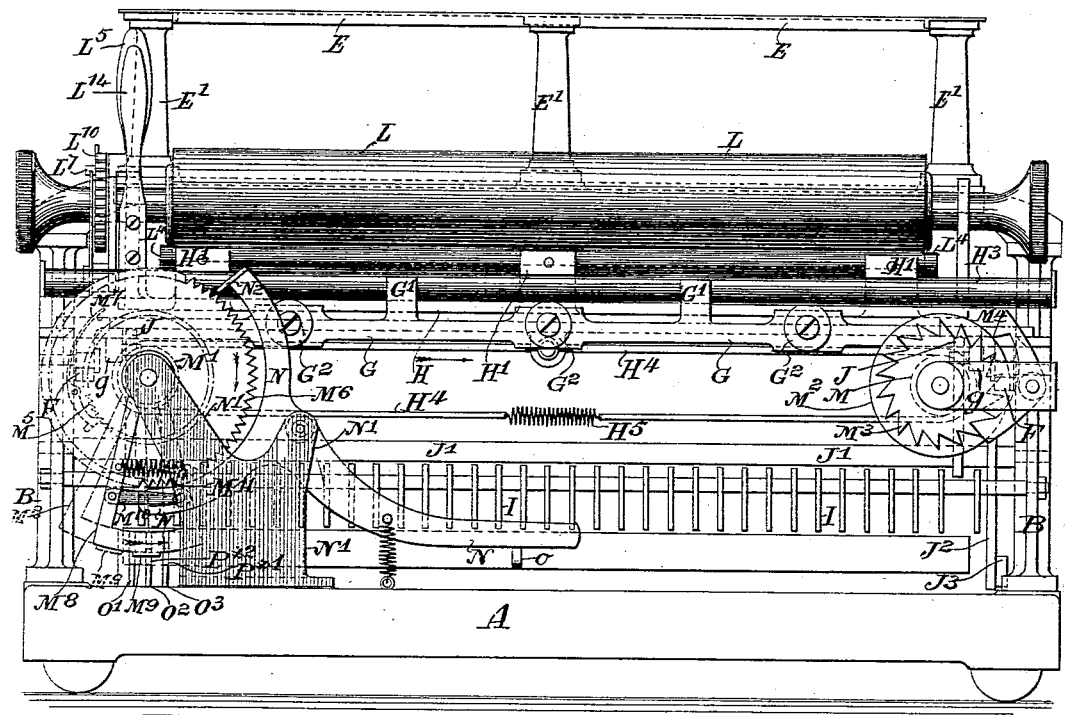
Figure 13:
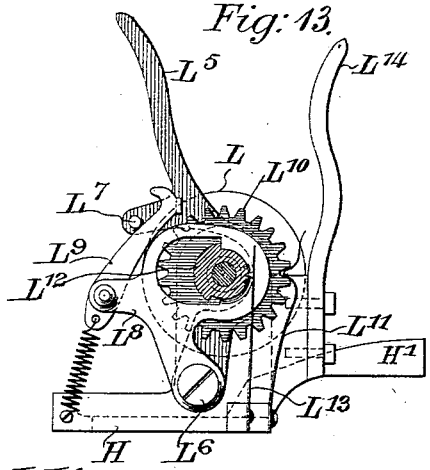
Figure 12:
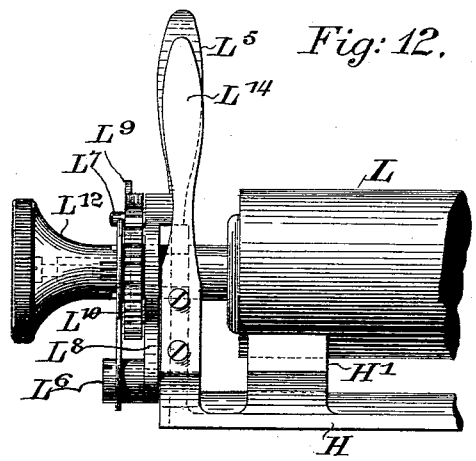

In the accompanying drawings, Figure 1 is a plan view of my improved type-writer. Fig. 2 is a longitudinal section taken on the line 1 2 of Fig. 1. Fig. $2^a$ is a plan view of a type-lever. Fig. 3 is a back view of the machine. Fig. 4 is a plan view showing in detail the several levers for moving the paper-carriage and for spacing. Fig. 5 is a side view showing the device for shifting the paper-carriage to suit the position of the several type. Fig. 6 is a vertical section of the same, taken on the line 1 2 of Fig. 5, and Fig $6^a$ shows part of the mechanism in another position. Fig. 7 is a side view of the spacing-levers. Fig. 8 is an elevation, and Fig. 9 a plan view, of the mechanism which permits the movement of the paper-carriage without operating the levers. Fig. 10 is a partial plan view, and Fig. 11 is a cross-section, showing the stop mechanism to aid in producing columns of figures. Fig. 12 is a plan view, and Fig. 13 a cross-section, showing mechanism for rocking around the paper-roller or impression-cylinder to present a fresh portion of the paper to the type; and Fig. 14 shows in plan view the underlining mechanism which is shown in side view at Fig. 2.

Similar letters of reference indicate corresponding parts throughout.

The machine consists of a base-plate A with standards B and bracket C, which carry the several working parts or to which these parts are pivoted.

D is a semicircular frame mounted on the standards B and carrying the type-levers, and E is a semicircular inking-pad carried in front of the type-levers on columns E', secured to the frame D.

F F are rollers secured to the side brackets C, and on these rollers works a longitudinally-moving carriage G. This carriage G carries a tranversely-moving carriage H, in which the impression-cylinder is mounted and around which the paper to receive the impress of the types is passed.

Upon the frame D and radially thereof are secured the brackets D', to which the type-levers are pivoted, one to each bracket, and extending toward the front of the machine. The type-levers consist of several parts, viz:

a lever or arm $a$, to one end of which the type or characters are secured, a link $b$, by which the arms $a$ are connected to the bracket $D'$, a curved or elbow lever $c$, pivoted to the bracket at $c'$ and also to the arm $a$ at $a'$, and a link $d$, connecting the elbow-lever $c$ with the multiplying-lever $e$, which is pivoted to a stump or pin $e'$ on the under side of the frame D. All the parts $a$, $b$, $c$, $d$, and $e$ are of thin sheet-steel, as indicated by the plan view, Fig. $2^a$, so that they take up but little space. The multiplying-lever $e$ is connected by an adjustable connection $f$ with the key-lever I. Of the keys there will preferably be three rows, arranged in the manner described in the former patent—that is to say, two rows of eleven keys and one row of ten keys, making thirty-two keys in all, and the key-levers I of each series have their fulcra on a separate rod carried by the brackets O. Upon the pivot $c'$ of the type-levers is mounted a coiled spring, which is so arranged that the elbow-lever $c$ will be returned to its normal position, (the drawn position on Fig. 2,) and with it the type lever or arm after each stroke. The type, which may be of any suitable material, are secured to the ends of the arms $a$, face upward, at varying angles, according to the position of each type-lever in the half-circle of the type-levers, as indicated by the dotted lines, Fig. 1, in order that the type shall always strike the paper on the center line, and the position of the type-lever when giving the stroke downward on the paper is indicated by the dotted lines of Fig. 2. This movement is somewhat peculiar and will now be described. Let it be assumed that the key-lever is depressed which pulls on the elbow-lever $c$. Immediately this lever commences to move it throws the link-pivot $b$ up (as the link assumes a more or less vertical position) and cants the type-arm downward, so that the type are moved clear of the ink-pad E. The continued motion of $c$ straightens out the link $b$ in line with the bracket and withdraws the type from under the pad. As the motion of $c$ continues, the link $b$ is turned over to the other side of the bracket, and the elbow-lever $c$ being pivoted to the type-lever $a$ in rear of the link $b$ the type-lever $a$ is caused to turn entirely over, so as to bring the type downward onto the paper. This arrangement of the type-levers is of considerable importance in a machine of this class, where the parts are necessarily somewhat crowded one upon the other, as it permits of the parts of the type-levers being made of thin steel, and therefore they take up but little space comparatively. It also permits of the type-heads being, so to speak, in rear of their fulcra, so that they lie on the greater radius, which allows them more room, the inner ends of the levers on the smaller radius being farther apart than heretofore. Thus the workmen in constructing the machine can more conveniently get at the parts. The whole of the parts of the type-lever can also be fitted together and the type-lever to its respective bracket before being placed in the machine, the bracket being secured to the frame D by two screws which pass through the holes in the flange of the bracket, as indicated in Fig. $2^a$.

As before mentioned, each type has three characters, and the paper-carriage G is moved backward and forward longitudinally of the machine to present the paper to the character required. This movement of the carriage G is effected in the following manner—that is to say, at each end and depending from the carriage G is a lug $g$, carrying a pin which enters the forked end of a lever-arm J. (See the detailed view, Fig. 5.) These lever-arms J are keyed to rock-shaft $J'$, which has its bearings in the side brackets C. Keyed to one end of this rock-shaft is a pendent lever-arm $J^2$, which is connected by a link-rod $J^3$ with the stem of a rocking inverted-T piece K, pivoted to a standard fixed to the base-plate near the front or keyboard of the machine. This T-piece K carries at the outer end of each arm a bell-crank lever $K'$ $K^2$, each provided with a key $K^3$ $K^4$, and these bell-crank levers are connected together (so that the key-arms shall always maintain the same vertical position) by a pivoted bar $K^5$, parallel to K, which bar $K^5$ is provided on its under edge with projections carrying pins $K^6$ $K^7$. A slide $K^8$, provided with a key $K^9$, and a pin $K^{10}$, works in rear of the bell-cranks $K'$ $K^2$ and bar $K^5$, and upon the face of the standard, a slot being formed therein to allow the slide to move irrespective of the pivot-pin of the bar $K^5$, which passes through the slide. $K^{11}$ is a spring provided with a spring hook or eye $K^{12}$, which is intended to take onto one of the pins $K^6$, $K^7$, or $K^{10}$. In the position shown in Fig. 5 the slide $K^8$ is down and the spring-hook $K^{12}$ is placed onto the pin $K^{10}$. The pin $K^{10}$ is in contact with the ends of the bell-crank levers $K'$ $K^2$, (one of which passes behind the other,) and consequently the parallel bars are held horizontal and the stem of the T-piece K vertical. In this position the paper-carriage will be at the center of its longitudinal travel, and the center character of the types (in the present instance the capital letters) will always strike the paper and the type-writing will be all capitals. To print small letters or figures, the keys $K^3$ or $K^4$ will be temporarily pressed down.

If the printing is to be mainly in small letters, the key $K^3$ will be pushed down and the spring-hook $K^{12}$ will be placed over the pin $K^6$ and the slide $K^8$ will be drawn up. The T-piece K will thus be rocked on its pivot and the stem will be thrown to the left. This movement, by means of the connecting-rod $J^2$, will rock the levers J so as to move the carriage G to the right, and thus bring the point of contact of the paper under the small characters of the type. (See Fig. $2^a$.) The parts will then be set in the position indicated in Fig. $6^a$—that is to say, the end of the bell-crank $K^2$ will be in contact with the pin $K^{10}$ on the raised slide $K^8$, and the bell-crank $K'$ will be some distance below it—and so long as the parts remain in this position the printing will be in small letters only. When a capital is required, the slide $K^8$ will be pushed down by pressing on the key $K^9$, and the pin $K^{10}$ will bring the bell-cranks $K'$ $K^2$ into line against the pressure of the spring $K^{11}$, the rock-shaft $J'$ will be rocked, and the carriage moved to bring the point of contact opposite the capitals. So long as the pressure is maintained on the key $K^9$ the "caps" will be printed. In like manner if it is desired to print a figure or a symbol the key $K^4$ will be pressed down and the paper-carriage will be moved in the opposite direction to bring the paper in position, and so long as this key is held down against the pressure of the spring $K^{11}$ figures, &c., will be printed, the spring returning the parts to their set position when the pressure on the key is removed. If columns of figures are required, the spring-hook $K^{12}$ will be placed on the pin $K^7$, the position of the parts being exactly the reverse of that shown at Fig. $6^a$. In this way the change from one character to another of the type can be readily effected without the expenditure of undue force, the spring $K^{11}$ always returning the parts to the set position, whichever it may be.

Referring now to the paper-carriage, which consists of two parts G and H, as before mentioned, G is a rectangular frame, which works on the rollers F, as before mentioned, and is provided with guides $G'$, which extend beyond the frame, as seen in Fig. 2. The rear bar of this frame carries a set of antifriction-rollers $G^2$, and the upper face of the front bar is surfaced to form a clean way for rollers $H^2$ of the part H. $G^3$ is a gong, which is struck in any convenient manner when the carriage H approaches the end of its travel. The part H consists of a rectangular frame with a standard at each end, with horns or extension-pieces $H'$ on the rear bar and with antifriction-rollers $H^2$ on the front bar, which rollers run on the front bar of the part G. Secured to the under side of the horns $H'$ by screws or otherwise is a rod $H^3$, which passes through the guides $G'$ and works on the rollers $G^2$ of the lower carriage G. Mounted in suitable bearings in the standards H is a cylinder L, which may be termed the "impression-cylinder," as the paper is on this cylinder when it receives the blow of the inked type. $L'$ is a nipping-roller, which is mouned in a rocking frame $L^2$, pivoted to the frame H, and it is caused to nip the paper by the action of a coiled spring. To the top of the frame $L^2$ is secured a shield $L^3$, which is caused by the same coiled spring to press on the paper near the point of contact where the type strikes, and thus keep the paper well down on the cylinder.

$L^4$ is a sheet-metal guide, which guides the paper into the nip of the rollers L $L'$. The axial motion of the cylinder L to progress the paper is produced and regulated by the mechanism shown at Figs. 12 and 13.

$L^5$ is a bent lever pivoted at $L^6$ to one standard of the carriage H and provided with a rearward extension carrying a pin $L^7$. On the same pivot $L^6$ is mounted a slotted lever or arm $L^8$, (the slot being formed with shoulders,) and pivoted to this arm $L^8$ is a pawl $L^9$, which lies in the path of the pin $L^7$ and between the lever $L^5$ and the arm $L^8$. Keyed on the axle of the cylinder L and in line with the pawl $L^9$ is a toothed wheel $L^{10}$, which is provided with a spring-retaining pawl $L^{11}$. Mounted loosely on the axle of the cylinder L is a sleeve $L^{12}$ with a milled head, and this sleeve is formed of two diameters, so as to produce shoulders, as shown by the section, Fig. 13. On the smaller diameter three notches are formed to receive the point of a spring-retaining pawl $L^{13}$, and $L^{14}$ is a fixed handle.

When it is desired to axially move the cylinder L, the two handles are grasped with the hand, and the handle $L^5$ is pressed forward. The pin $L^7$ first comes into contact with the pawl $L^9$, which is tipped into a tooth of the wheel $L^{10}$, and the wheel is then rotated the distance of one, two, or three teeth, according to the manner in which it is set, to give a space equal to one, two, or three lines. The setting is effected by turning the sleeve $L^{12}$ to bring one or other of its three notches opposite the pawl $L^{13}$. By this means the top shoulder of the sleeve is advanced or withdrawn, and consequently the movement of the slotted arm $L^8$ backward will be restricted or enlarged, because the top shoulder of the slot will strike the shoulder on the sleeve at an earlier or later period of time. In this way the lever $L^8$ and the pawl $L^9$ are moved a less or greater distance, so that the pawl as it moves backward with the arm will move over one, two, or three teeth, as the case may be, and will rock around the cylinder (when pressed forward) a corresponding distance, thus giving a narrow or wide spacing between the lines of type, as desired. The carriage H is moved transversely of the machine by means of the band or chain $H^4$, which is adjustably attached to a central bar of the frame H, and the free ends after passing twice around a pulley (one at each end of the machine) are connected together by an adjustable connection, which may be a spring $H^5$, as shown at Figs. 3 and 8. Motion is communicated to the chain by a spring, the action of which is regulated by an escape movement operated by the usual spacing and key levers, as substantially described in the specification of the former patent.

M $M'$ are the pulleys, at opposite ends of the machine, on which the chain is mounted, and these pulleys are fixed on their axles, which are mounted in brackets secured to the frame of the machine. On the axle M is mounted loosely a motor-drum $M^2$, which is connected to the axle by a coiled motor-spring in the way common to spring-motors. Fixed to the side of this drum is a ratchet-wheel $M^3$, which is provided with a double pawl $M^4$, pivoted on the axle-bracket. By turning the drum $M^3$ the distance of a few teeth a certain amount of tension is put on the spring. This will be done when the paper-carriage is at the end of its stroke, so that there will always be a reserve of power. When the carriage is returned to the commencement of its stroke by hand, in the usual way, the spring will be further wound up, and the power to propel the carriage during the working of the machine is thus provided. The power has to be given out intermittently to produce a step-by-step motion of the carriage, and this is effected by means of the escapement at the opposite end of the machine. The general form of this escapement is similar to that described and shown at Figs. 12 and 13 in the former patent before referred to. On the axle of the pulley $M'$ is keyed a fine-tooth ratchet-wheel $M^5$, and by the side of it and mounted loosely is a toothed wheel $M^6$, which carries a pawl $M^7$, by which the two wheels $M^5$ $M^6$ are connected together. Outside the wheel $M^6$ is mounted, also loosely, a sector-frame $M^8$, having at its bottom edge a projection or stop $M^9$. To one side bar of the frame $M^8$ is pivoted an arm $M^{10}$, at the outer end of which is pivoted a pallet $M^{11}$, which takes into the teeth of the wheel $M^6$. The pivot-pin of this pallet projects into a slot near the end of one arm of the escape-lever N, which has its fulcrum in a bracket $N'$, attached to the frame of the machine. At the end of the other arm of the escape-lever N is a fixed pallet $N^2$, which also takes into the teeth of the wheel $M^6$. The tail of this lever N projects toward the center of the machine and overlies an arm $o$, operated either by the key-levers or by the spacing-lever O, a coiled spring, as shown, being used to return the lever N to its normal position.

P $P'$ $P^2$ are three rectangular frames arranged one within the other and serve for the letter-spacing, as in the before-mentioned patent. These frames are pivoted to short standards on the base-plate A. The front bar of the frame P underlies the key-levers and the spacing-lever O, on the depression of either of which the frame is rocked and the tail of the escape-lever N is raised by the projecting arm $o$, thus permitting the escape-wheel $M^6$ to advance under the tension of the spring in the barrel $M^2$, as will be hereinafter explained. The frames $P'$ $P^2$ carry projections $P^{*'}$ $P^{*2}$, which extend beyond the stop $M^9$ of the sector-frame and serve when raised to limit the travel of the sector $M^8$, which in turn limits the advance of the escape-wheel, as will be described.

The action is as follows: On depressing the spacing-lever O the frame P is rocked and the arm $o$ is raised, which raises the tail of the lever N and rocks the pallet-arms in opposite directions. This operation throws the pallet $N^2$ into the teeth of the wheel $M^6$ and withdraws the pallet $M^{11}$, and thus the sector-frame $M^8$ is free to be drawn forward by its spring, so that the pallet $M^{11}$ is moved past one or more teeth, as desired. The ordinary distance is four teeth, but this can be regulated to one, two, or three by a mechanism to be presently described. Now let the lever N return to its normal position under the influence of its coiled spring. The pallet $N^2$ will be withdrawn from and the pallet $M^{11}$ thrown into the teeth of the wheel $M^6$, and the wheel will be free to rotate in the direction of the arrow a distance limited by the working of the pallet-pin in the slot of the lever N, the movement being caused by the spring in the barrel $M^2$, at the other end of the machine, pulling on the chain, which passes twice around the pulley $M'$. The sector-frame will then assume the dotted position of Fig. 3. In addition to the ordinary spacing-lever O, I provide additional spacing-levers $O'$ $O^2$ $O^3$, the operations of which serve to limit, as is the case with the extensions $P^{*'}$ $P^{*2}$ of the levers $P'$ $P^2$, the movement of the sector-frame and its pallet to the distance of one, two, or three teeth, respectively. The ends of these levers project to the back of the machine beyond the stop $M^9$ of the sector-frame $M^8$, and the ends of $O^2$ and $O^3$ underlie the extensions $P^{*'}$ $P^{*2}$. (See Figs. 1, 2, 3, 4, and 7.) When this frame is in the dotted position, Fig. 3, and the spacing is to be limited to one tooth, spacing-lever $O'$ is depressed. This will throw up the tail of the lever, so that the projection $M^9$ will strike against it as it comes forward and be stopped. As the pallet $M^{11}$ by this time will have moved the distance of one tooth only it will be evident that, so long as the lever $O'$ is depressed, the spacing will only be the distance of one tooth. In like manner, if $O^2$ be depressed the sector-frame will travel so much farther and the spacing will be so much greater, and when neither of these levers $O'$, $O^2$, or $O^3$ is depressed the sector will travel its normal distance, and the spacing will be normal, or a distance of four teeth. Means may be provided for holding down the spacing-levers $O'$, $O^2$, or $O^3$, so that the amount of spacing may be set, as desired, though the spacing will be effected in every case by the operation of the spacing-lever O in the usual way.

In type-writing it is often necessary to return the paper a short distance in order to put in a missing letter or for other purposes or to advance it some distance without printing, so as to leave a greater or less space; and in order to provide for effecting these movements quickly and without undue labor I make use of the device shown at Figs. 8 and 9.

R is a bar, which is pivoted to the ends of the parts $H'$ of the paper-carriage by the links $R'$, one of which is formed with a handle $R^2$. This bar R overlies the bent end of a lever $R^3$, which has its fulcrum on a stud $R^4$, extending from a lug on the frame G, and also has attached to its free arm a curved spring $R^5$. At one end this spring $R^5$ abuts against the pulley M', (around which the chain passes,) which forms, in effect, a fixed abutment. At the other end this spring $R^5$ bears against a disk $R^6$, carried by a sleeve mounted and capable of sliding on the axle of the pulley M', and which is kept in its normal position (the drawn position, Fig. 9) by a coiled spring $R^7$. This disk $R^6$ is intended to throw the pawl $M^7$, carried by the toothed wheel $M^6$, out of gear with the toothed wheel $M^5$ and thus release this latter wheel, so that the axle M' may be rotated independently of the escapement N. This effect is produced by raising the handle $R^2$ to the dotted position, which causes the bar R to rock the lever $R^3$ and straighten out or flatten the curved spring $R^5$, which, being thus expanded, pushes the disk $R^6$ into the dotted position. (See Fig. 9.) The edge of the disk $R^6$ thus comes into contact with the inclined face of the pawl $M^7$ and forces the pawl out of the teeth of the wheel $M^5$, which, as mentioned above, is thus free to rotate irrespective of the escapement N. When the desired position of the carriage is attained, the handle $R^2$ is let go and the parts assume their normal position under the influence of the several springs.

With type-writers as at present most commonly constructed it is difficult to produce columns of figures, as no means are provided for stopping the travel of the paper-carriage at the exact position for the column of figures, and consequently much time is wasted in finding out the exact position. I have therefore designed a means by which the paper may be positively set in position for each line when it is desired to produce columns of figures. S S, Figs. 10 and 11, are pins or studs fitted (it may be adjustably) to the front bar of the paper-carriage H, and S' is a box secured to the frame D of the type-levers and in which a spring-plunger $S^2$ works. The normal position of this plunger is more or less withdrawn in its box, so as to be clear of the stud S, (see Fig. 11;) but when it is desired to arrest the movement of the carriage it is pushed forward and held in its forward position by a bayonet-catch, or in any other convenient manner, so that it will strike against a pin situate in a position relative to the column of figures. The carriage will be pulled back in the ordinary way approximately to the position required, and the plunger then being pushed forward, strikes against a pin S and stops exactly each time in the position required. In this way much labor and time are saved in gaging the position of the column of figures. The underlining of words is also an operation which is generally very crudely provided for in type-writers, and I therefore provide means whereby this operation may be readily effected. These means are shown in elevation at Fig. 2 and in plan view at Fig. 14 on the same sheet of drawings.

T is a bar, which is pivoted at both ends to the standards of the impression-cylinder L. This bar is common to type-writers and is intended, in its normal position, (the position shown in dotted lines, Fig. 2,) to rest upon the paper in advance of the lines of writing and thus hold it down onto the impression-cylinders while being printed upon. Upon this bar is mounted a slide T', which is cylindrical externally, and upon it is mounted a rocking arm $T^2$. At the end of this arm is conveniently mounted a rotating disk $T^3$, which forms the marker. The arm $T^2$ carries a standard $T^4$, to which is secured a stud-axle for an inking-roller $T^5$, with which the marking-disk $T^3$ runs in contact. The marker is held out of contact with the paper by a suitable spring, a finger-piece $T^6$ being employed to rock the arm $T^2$ and bring the disk $T^3$ onto the paper as well as to move the slide T' along the bar T. When it is desired to underline, the bar T is brought over to the drawn position, Figs. 2 and 14, and the underlining device, which had in the normal position of the bar been resting between the end of the cylinder L and the standard, as indicated by dotted lines, Fig. 14, is moved forward to the position desired, and is then pressed onto the paper and run along the bar as far as may be necessary. In this way a continuous line is made instead of a number of short dashes, as heretofore, and in much less time, the dimensions of the device being such that the disk shall touch the paper immediately below the line of writing. When the underlining has been effected, the device is brought to one end of the impression-cylinder and the bar T is turned over to its normal position, resting on the paper.

What I claim is—

1. In a type-writer, the combination with operating-keys I, multiplying-levers $e$ and connecting-rods $d\,f$, of a semicircular frame D, type-levers each consisting of a bracket D' affixed to said frame D and extending toward the rear of the machine, a type-bar $a$ extending toward the front of the machine and having the type on its upper side at one end, a link $b$ connecting the other end of the type-bar with the end of the bracket D', a lever $c$ the longer arm of which is curved or bent back on itself at about the center of its length and is pivoted to the type-bar $a$ near its fulcrum but at a point above that of the connection of the link with the bracket while the shorter arm is pivoted to a connecting-rod $d$, said lever $c$ being fulcrumed to the bracket D' by a pin $c'$ below but in front of the connection of the link $b$ with the bracket, a coiled spring on the fulcrum-pin $c'$, and an inking-pad E above the types, the whole operating to tip the types downward clear of and withdraw them from under the inking-pad, turn them right over and cause them to strike downward on the paper with a sharp blow, all substantially as described.

2. In a type-writer, the combination with a fixed frame and type-levers each carrying two or more types and having a stationary fulcrum, of a lower carriage G and antifriction-rollers F for the same carried by the fixed frame, the said carriage having at one side a way or course for wheels and at the other side rollers $G^2$, means for shifting the said carriage for one or other of said types from the keyboard or in proximity thereto, an upper carriage H to carry the impression-cylinder provided at one side with wheels $H^2$ to run on the way or course of the lower carriage and at the other side with a rod or bar $H^3$ which bears and runs upon the said rollers $G^2$, and means for feeding the upper carriage H step by step in a direction parallel with the impression-cylinder, the whole operating to change the position of the impression-cylinder with respect to the types on the type-levers when necessary before the printing of each letter, as set forth.

3. In a type-writer, the combination with the longitudinally-moving carriage G, of the rock-shaft $J'$ having a forked lever-arm J and arm $J^2$, the rocking T-piece K, the key bell-cranks $K' K^2$ carried by said rocking T-piece, the connecting-rod $J^3$ between said T-piece and arm $J^2$, the key-slide $K^8$, the oscillating connecting-bar $K^5$, pins $K^6 K^7 K^{10}$, and spring-catch $K^{11} K^{12}$, by the operation of which combination the movement of the carriage is effected and its position adjusted according to the work, as and for the purpose set forth.

4. In a type-writer, the combination with the impression-cylinder carriage H, of the endless operating elastic chain or belt $H^4 H^5$ permanently attached to the said carriage H, a spring-actuated motor-drum $M^2$ for actuating said chain, an escapement mechanism for causing the said chain and carriage to make their movements step by step, a spacing-lever O, and means for adjusting the width of the spacing within certain limits consisting of a stop sector-frame $M^8$, levers $P' P^2$ with extensions $P^{*'} P^{*2}$ and spacing-levers $O' O^2$ and $O^3$, all substantially as and for the purpose herein described.

5. In a type-writer, the combination with an escapement mechanism operated by the ordinary spacing-lever O, of a sector $M^8$, carrying a stop $M^9$ and an adjustable pawl $M^{10}$, and additional spacing-levers $O'$, $O^2$, $O^3$, by the operation of which, the amount of travel given to the paper-carrier is regulated according to requirements, and within certain limits, as and for the purpose set forth.

6. In a type-writer, the combination with an escapement mechanism provided with a movable stop device, spacing-lever O, and spacing levers or frames P, $P'$, $P^2$, of extension-pieces $P^{*'} P^{*2}$, and additional spacing-levers $O'$, $O^2$, $O^3$, as and for the purpose set forth.

7. In a type-writer, the combination with the escapement mechanism and the carriage G, H, of means for throwing the escapement out of gear, in order to move the carriage irrespective thereof, such means consisting of the bar R and its accessories, lever $R^3$, bent spring $R^5$, spring-controlled disk $R^6$, and the inclined faces of the pawl $M^7$, as set forth.

8. In a type-writer, the combination with the impression-cylinder and carriage H, of the means for axially operating the cylinder, and for regulating the amount of motion to be given according to requirements, and consisting of the lever $L^5$ and pin, the lever $L^8$ and pawl, the toothed wheel $L^{10}$ and spring-pawl, the shouldered and notched sleeve $L^{12}$, and spring-pawl, and the fixed handle $L^{14}$, as set forth.

9. In a type-writer, the combination with the impression-cylinder L and the transversely-moving carriage H in which said cylinder is mounted, of means for producing continuous underlining and consisting of the bar T pivoted to the said carriage, the slide $T'$ mounted upon said bar, the rocking arm $T^2$ mounted on said slide, the rotary marking-disk $T^3$ mounted on said rocking arm and the inking-roller $T^5$ mounted on said arm, all substantially as herein set forth.

JOHN NEVIL MASKELYNE, JUNR.

Witnesses:
JOSEPH LAKE,
THOMAS LAKE.